US009406150B2

(12) United States Patent
Edelhaeusser et al.

(10) Patent No.: US 9,406,150 B2
(45) Date of Patent: *Aug. 2, 2016

(54) CONCEPT FOR ENCODING DATA DEFINING CODED ORIENTATIONS REPRESENTING A REORIENTATION OF AN OBJECT

(75) Inventors: Thorsten Edelhaeusser, Nuremberg (DE); Hans Holm Fruehauf, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 520 days.

This patent is subject to a terminal disclaimer.

(21) Appl. No.: 13/323,852

(22) Filed: Dec. 13, 2011

(65) Prior Publication Data

US 2012/0163464 A1    Jun. 28, 2012

Related U.S. Application Data

(60) Provisional application No. 61/426,708, filed on Dec. 23, 2010.

(30) Foreign Application Priority Data

Dec. 23, 2010 (EP) .................................... 10196868

(51) Int. Cl.
*H04N 19/139* (2014.01)
*G06T 9/00* (2006.01)

(52) U.S. Cl.
CPC ................ *G06T 9/00* (2013.01); *H04N 19/139* (2014.11)

(58) Field of Classification Search
None
See application file for complete search history.

(56) References Cited

U.S. PATENT DOCUMENTS

| | | | |
|---|---|---|---|
| 5,361,105 A * | 11/1994 | Iu ................................... 348/699 |
| 6,473,458 B1 * | 10/2002 | Shimizu et al. ........... 375/240.11 |
| 6,611,559 B1 * | 8/2003 | Shingo et al. ............. 375/240.16 |
| 7,646,437 B1 * | 1/2010 | Dumitras ................ H04N 5/145 |
| | | | 348/700 |
| 2008/0159596 A1 * | 7/2008 | Li et al. ......................... 382/107 |
| 2010/0079605 A1 * | 4/2010 | Wang et al. ................ 348/208.4 |
| 2011/0080955 A1 * | 4/2011 | Shi et al. .................. 375/240.16 |

OTHER PUBLICATIONS

Official Communication issued in corresponding European Patent Application No. 10196868.3, mailed on Sep. 13, 2011.

(Continued)

*Primary Examiner* — Kevin McInnish
(74) *Attorney, Agent, or Firm* — Keating & Bennett, LLP

(57) ABSTRACT

Embodiments of the present invention provide an encoder for encoding data defining coded orientations representing a reorientation of an object based on spatio-temporal data representing a time series of orientations of the object. The encoder includes a deriver, a selector, and a coder. The deriver is configured for deriving a plurality of components describing an orientation change difference between a last coded orientation change from a second last coded orientation to a last coded orientation, and a current orientation change from the last coded orientation to a current orientation of the object. The selector is configured for selecting a component of the plurality of components describing the orientation change difference. The coder is configured for coding the current orientation of the object based on the select component of the plurality of components describing the orientation change difference, thereby defining a current coded orientation.

15 Claims, 3 Drawing Sheets

(56) References Cited

OTHER PUBLICATIONS

Dimitrova et al., "Motion Recovery for Video Content Classification," ACM Transactions on Information Systems, vol. 13, No. 4, Oct. 1, 1995, New York, NY, pp. 408-439.

Hwang et al., "An Efficient Shape Coding Scheme and Its Codec Design," Signal Processing Systems, 2001 IEEE Workshop, Sep. 26-28, 2001, Piscataway, NJ, pp. 225-232.

Pelekis et al., "Similarity Search in Trajectory Databases," 14th International Symposium on Temporal Respresentation and Reasoning, (Time '07) 2007, 12 pages.

Li et al., "Modeling of Moving Objects in a Video Database," IEEE, 1997, pp. 336-343.

Meratnia et al., "Trajectory Representation in Location-based Services: Problems & Solution," Proceedings of the Fourth International Conference on Web Information Systems Engineering Workshops (WISEW'03), 2004, 7 pages.

Kojima et al., "Generating Natural Language Description of Human Behavior from Video Images," IEEE, 2000, pp. 728-731.

Chen et al., "Symbolic Representation and Retrieval of Moving Object Trajectories", MIR'04, Oct. 15-16, 2004, New York, NY, pp. 227-234.

Potamias et al., "Sampling Trajectory Streams with Spatiotemporal Criteria", Proceedings of the 18th International Conference on Scientific and Statistical Database Management (SSDBM'06), 2006, 10 pages.

Potamias, "Compressing Trajectory Data of Moving Objects", Oct. 19, 2005, 5 pages.

Xu et al., "DTTC; Delay-Tolerant Trajectory Compression for Object Tracking Sensor Networks", Proceedings of the IEEE International Conference on Sensor Networks, Ubiquitous, and Trustworthy Computing (SUTC'06), 2000, 8 pages.

Cao et al., "Spatio-temporal Data Reduction with Deterministic Error Bounds", DIALM-POMC '03, Sep. 19, 2003, San Diego, CA, pp. 33-42.

Gandhi et al., "Space-efficient Online Approximation of Time Series Data: Streams, Amnesia, and Out-of-Order", IEEE, ICDE Conference 2010, pp. 924-935.

Gudmundsson et al., "Compressing Spatio-temporal Trajectories", Computational Geometry—Theory and Applications, Jan. 31, 2008, pp. 1-32.

Nicolaucig et al., "Lossy Compression of TPC Data and Trajectory Tracking Efficiency for the ALICE Experiment", Nuclear Instruments and Methods in Physics Research A 500, 2003, pp. 412-420.

Edelhaeusser et al., "Concept for Encoding Data Defining Coded Positions Representing a Trajectory of an Object", U.S. Appl. No. 13/323,850, filed Dec. 13, 2011.

Li et al., "Motion-Alert: Automatic Anomaly Detection in Massive Moving Objects", ISI'06 Proceedings of the 4th IEEE international conference on Intelligence and Security Informatics, 2006, 13 pages.

Meratnia et al., "A new perspective on trajectory compression techniques", Proceedings of ISPRS Commission II and IV, Working Groups II/5, II/6, IV/1 and IV/2 Joint Workshop on Spatial, Temporal and Multi-dimensional Data Modelling and Analysis, Oct. 2-3, 2003, Quebec city, Canada, pp. 1-8.

Schmid et al., "Semantic Trajectory Compression", 11th International Symposium, SSTD 2009 Aalborg, Denmark, Jul. 8-10, 2009 Proceedings, 6 pages.

Frentzos et al., "On the Effect of Trajectory Compression in Spatiotemporal Querying", 11th East European Conference, ADBIS 2007, Varna, Bulgaria, Sep. 29-Oct. 3, 2007, Proceedings, 16 pages.

\* cited by examiner

CONCEPT FOR ENCODING DATA DEFINING CODED ORIENTATIONS REPRESENTING A REORIENTATION OF AN OBJECT

CROSS-REFERENCE TO RELATED APPLICATIONS

This application claims priority from European Patent Application No. 10196868.3, which was filed on Dec. 23, 2010, and is incorporated herein in its entirety by reference.

BACKGROUND OF THE INVENTION

Embodiments of the present invention relate to a concept for encoding data defining coded orientations representing a reorientation of an object based on spatio-temporal data representing a time series of orientations of the object.

Traditional location systems rely on spatio-temporal data of located objects. Spatio-temporal data may be used for visualizing scenes, e.g. for an operator that directs bus drivers to the next free parking slot. Or for an autonomic monitoring system that checks if all objects are within a certain boundary and that gives an alarm if an object reaches into a dangerous area, for example, if a human reaches a pressing plant. But spatio-temporal representations reach their limits if more information on the object itself is necessitated, in particular, if the behavior is important. A good example is a soccer match, where a viewer wants to automatically detect an event, such as that a player is performing a sprint or that the ball is kicked. Just from spatio-temporal data such events can hardly be detected.

Spatio-temporal data is also not amenable to matching of trajectories. The reason is that trajectories have to be rotated, translated, and scaled, before a similarity can be detected. Also, coordinates are not intuitive for describing a trajectory. For example, a set of coordinates and time stamps along a synthetic trajectory have to be defined.

Current research on trajectory representation is mainly targeted to queries in databases, i.e. to search for similar stored trajectories or for time series with some specific characteristics. In the article "Similarity search in trajectory databases", N. Pelekis, I. Kopanakis, G. Marketos, I. Ntoutsi, G. Andrienko, and Y. Theodoridis introduce a set of similarity metrics for querying trajectories, that not only find similar trajectories but that also support trajectory clustering and mining tasks. Their distance operator, called Locality In-between Polylines (LIP), calculates the crossing area of two trajectories. Further, operators for time-aware spatio-temporal trajectory similarity search are defined. The underlying dataset consists of a classical spatio-temporal database.

In the article "Modeling of moving objects in a video database", J. Li, M. Ozsu, and D. Szafron introduce a trajectory representation of a sequence of motions, which are expressed on a series of displacement, moving direction and time interval. The moving direction can be one of the eight cardinal points (NT, NE, ET, SE, ST, SW, WT, NW). Trajectories are compared by a moving spatio-temporal relationship (mst-relation), which is a set of topological relations, directional relations and a time interval. This approach results in an abstraction and human readability of the spatio-temporal data, but does not allow a detailed reconstruction of the trajectory.

A grouping algorithm is shown in the article "Trajectory representation in location-based services: prRBLems & solution" by Meratnia and de By to select regions in trajectories where the velocity or acceleration is constant. The trajectories are segmented by break points and represented by functions that are fitted into the resulting segments. The representation abstracts the trajectory in a very compact way, but does not allow a direct online approach, because a set of samples is needed for grouping. This introduces latency that is worth for online applications in Real-Time Location Systems (RTLSs).

In the article "Motion-alert: Automatic anomaly detection in massive moving objects", X. Li, J. Han, and S. Kim present a motion classifier that is based on movement features, called motifs. An object's path consists of a sequence of motif expressions, which are an abstraction of the underlying trajectory segment, at a given time and location, for example, "Right-Turn 3 am, 17". This abstraction level is suitable for classification task, but a detailed reconstruction of the original trajectory is not possible.

A similar approach is shown by A. Kojima, M. Izumi, T. Tamura, and K. Fukunaga in the article "Generating natural language description of human behavior from video images". The motion is described by a more human language inspired expression, with the objective to explain the object's behavior. The behavior is estimated by evaluating the pose and position in relation to surrounding objects. The main focus is to generate a human readable text, which is created by a machine translation technique. Since the objective is to maximize the readability for humans, the resulting text is not suitable for detail trajectory analysis.

A Movement Pattern String (MPS) is proposed by L. Chen, M. T. Özsu, and V. Oria in "Symbolic representation and retrieval of moving object trajectories" to represent trajectories as a string of symbols. The symbols are selected by calculating the movement direction and movement distance ratio for every sampling point and choosing the corresponding symbol from a quantization map. The similarity of two trajectory strings is determined by calculating the Edit Distance on Real Sequence (EDR), which is a derivation of the Levenshtein distance. The distance ratio needs to know the whole trajectory size that prohibit an online translation. Also the readability of the symbol string is less suitable for humans.

A resampling based concept is described in the article "A new perspective on trajectory compression techniques" from N. Meratnia and R. A. de By. A further resampling based concept is described in the article "Sampling trajectory streams with spatiotemporal criteria" from M. Potamias, K. Patroumpas, and T. Sellis. Another resampling based concept is described in the article "Compressing trajectory data of moving objects" from M. Potamias.

In the article "Semantic trajectory compression" from F. Schmid, K.-F. Richter, and P. Laube, a semantic based concept is described.

Y. Xu and W.-C. Lee describe in their article "Delay-tolerant compression for object tracking sensor network" a segmentation and approximation based concept. Thereby, trajectories are segmented and approximated via functions. Thereby, the segmentation necessitates an amount of points resulting in a high latency.

Further convention is known from the article "Spatio-temporal data reduction with deterministic error" from H. Cao, O. Wolfson, and G. Trajcevski; the article "On the effect of trajectory compression in spatiotemporal querying" from E. Fretznos, and Y. Theodoridis; the article "Space-efficient online approximation of time series data: Streams, amnesia, and out of order" from S. Gandhi, L. Foschini and S. Suri; the article "Compressing spatio-temporal trajectories" from J. Gudmundsson, J. Katajainen, D. Merrick, C. Ong, and T. Wolle; and the article "Lossy compression of tpc data and trajectory tracking efficiency for the alice experiment" from A. Nicolaucig, M. Ivanov and M. Mattavelli.

Furthermore, when transmitting location data of a moving object at run time, as it is the case in real time location systems (RTLSs), large amounts of data or data quantities occur at high sample rates or with a high number of transmitted location data. For long time storage or transmission to mobile terminal devices, reducing the amount of data saves memory space or bandwidth, respectively. Since data mostly have to be processed in real time during transmission, classical compression techniques cannot be used here. The data have to be compressed and decompressed at run time without introducing process-induced latencies.

SUMMARY

According to an embodiment, an encoder for encoding data defining coded orientations representing a reorientation of an object based on spatio-temporal data representing a time series of orientations of the object may have: a deriver for deriving a plurality of components describing an orientation change difference between a last coded orientation change from a second last coded orientation to a last coded orientation, and a current orientation change from the last coded orientation to a current orientation of the object; a selector for selecting a component of the plurality of components describing the orientation change difference; and a coder for coding the current orientation of the object based on the selected component of the plurality of components describing the orientation change difference, thereby defining a current coded orientation.

According to another embodiment, a decoder for decoding data defining coded orientations representing a reorientation of an object based on spatio-temporal data representing a time series of orientations of the object may have: a receiver for receiving a data item having a component value and a syntax element, the syntax element coding a selected component of a plurality of components describing an orientation change difference between a last coded orientation change from a second last coded orientation to a last coded orientation, and a current orientation change from the last coded orientation to a current orientation of the object, wherein the component value indicates the value of the selected component of the plurality of components describing the orientation change difference; and a deriver for deriving the current coded orientation change by applying the component value to the selected component of the last coded orientation change, the current coded orientation change thereby describing a reorientation of the object from the last coded orientation to the current coded orientation.

According to another embodiment, a method for encoding data defining coded orientations representing a reorientation of an object based on spatio-temporal data representing a time series of orientations of the object may have the steps of: deriving a plurality of components describing an orientation change difference between a last coded orientation change from a second last coded orientation to a last coded orientation, and a current orientation change from the last coded orientation to a current orientation of the object; selecting a component of the plurality of components describing the orientation change difference; and coding the current orientation of the object based on the selected component of the plurality of components describing the orientation change difference, thereby defining a current coded orientation.

According to another embodiment, a method for decoding data defining coded orientations representing a reorientation of an object based on spatio-temporal data representing a time series of orientations of the object may have the steps of: receiving a data item having a component value and a syntax element, the syntax element coding a selected component of a plurality of components describing an orientation change difference between a last coded orientation change from a second last coded orientation to a last coded orientation, and a current orientation change from the last coded orientation to a current orientation of the object, wherein the component value indicates the value of the selected component of the plurality of components describing the orientation change difference; and deriving the current coded orientation change by applying the component value to the selected component of the last coded orientation change, the current coded orientation change thereby describing a reorientation of the object from the last coded orientation to the current coded orientation.

Another embodiment may have a computer program having a program code for performing, when running on a computer or microprocessor, an inventive method.

According to another embodiment, a data stream with data items defining coded orientations representing a reorientation of an object based on spatio-temporal data representing a time series of orientations of the object may have: a component value and a syntax element, the syntax element coding a selected component of a plurality of components describing an orientation change difference between a last coded orientation change from a second last coded orientation to a last coded orientation, and a current orientation change from the last coded orientation to a current orientation of the object, wherein the component value indicates the value of the selected component of the plurality of components describing the orientation change difference.

Embodiments of the present invention provide an encoder for encoding data defining coded orientations representing a reorientation of an object based on spatio-temporal data representing a time series of orientations of the object. The encoder comprises a deriver, a selector, and a coder. The deriver is configured for deriving a plurality of components describing an orientation change difference between a last coded orientation change from a second last coded orientation to a last coded orientation, and a current orientation change from the last coded orientation to a current orientation of the object. The selector is configured for selecting a component of the plurality of components describing the orientation change difference. The coder is configured for coding the current orientation of the object based on the select component of the plurality of components describing the orientation change difference, thereby defining a current coded orientation.

In some embodiments, the deriver may be configured to derive a next plurality of components describing an orientation change difference between a current coded orientation change from a last coded orientation to a current coded orientation, and a next orientation change from the current coded orientation to a next orientation of the object. Thereby, the selector may be configured to select a component of the next plurality of components describing the next orientation change difference. Furthermore, the coder may be configured to code the next orientation of the object based on the selected component of the next plurality of components describing the next orientation change difference, thereby defining a next coded orientation.

Furthermore, the deriver may be configured to derive the plurality of components describing the orientation change difference such that the plurality of components correspond to Euler angles of a reference system.

In addition, the selector may be configured to compare the absolute values of the plurality of components, and to select the component comprising the greatest absolute value.

In some embodiments, a high compression rate of spatio-temporal data may be achieved by encoding merely or solely one component of the plurality of components describing the orientation change difference between the last coded orientation change and the current orientation change. In a three dimensional space, the orientation change of the object might be described by three components. Since in each encoding step the object changes its orientation usually or mainly only in one direction (or component), it is enough to encode the component of the plurality of components (describing the orientation change difference) comprising the greatest absolute value. Thereby, the absolute values of the plurality of components describing the orientation change difference might be compared, wherein the component comprising the greatest absolute value might be selected and encoded. Furthermore, an error propagation is minimized by deriving the plurality of components describing the orientation change difference in each encoding step based on the current orientation change to the current (or actual) orientation of the object.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
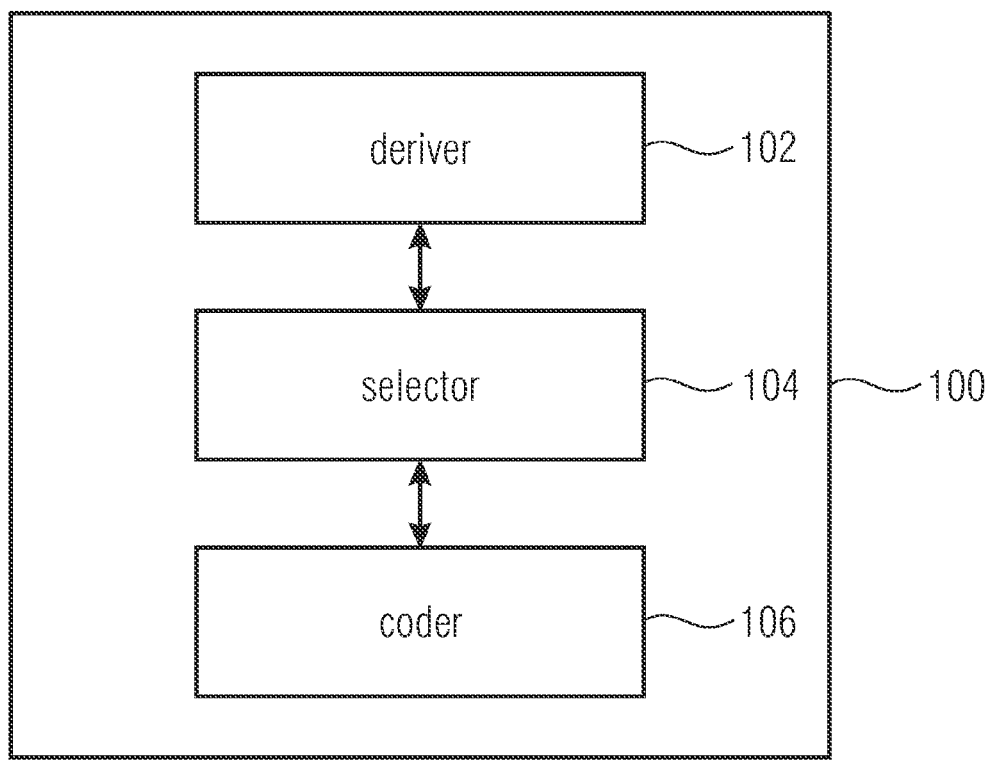
FIG. 1a shows a block diagram of an encoder for encoding data defining coded orientations representing a reorientation of an object.

Equal or equivalent elements or elements with equal or equivalent functionality are denoted in the following description by equal or equivalent reference numerals.

FIG. 1a shows an encoder 100 for encoding data defining coded orientations representing a reorientation of an object based on spatio-temporal data representing a time series of orientations of the object. The encoder 100 comprises a deriver 102, a selector 104 and a coder 106. The deriver 102 is configured for deriving a plurality of components describing an orientation change difference between a last coded orientation change from a second last coded orientation to a last coded orientation, and a current orientation change from the last coded orientation to a current orientation of the object. The selector 104 is configured for selecting a component of the plurality of components describing the orientation change difference. The coder 106 is configured for coding the current orientation of the object based on the selected component of the plurality of components describing the orientation change difference, thereby defining a current coded orientation. In some embodiments, the deriver 102, the selector 104 and the coder 106 may be implemented in an integrated circuit (IC), a field programmable gate array (FPGA) or a digital signal processor (DSP).

In the following, the functionality of the encoder 100 is exemplarily described with respect to an illustrative portion of a reorientation of an object involving three consecutive orientations, the portion being shown in FIG. 1b.

Figure 1B:
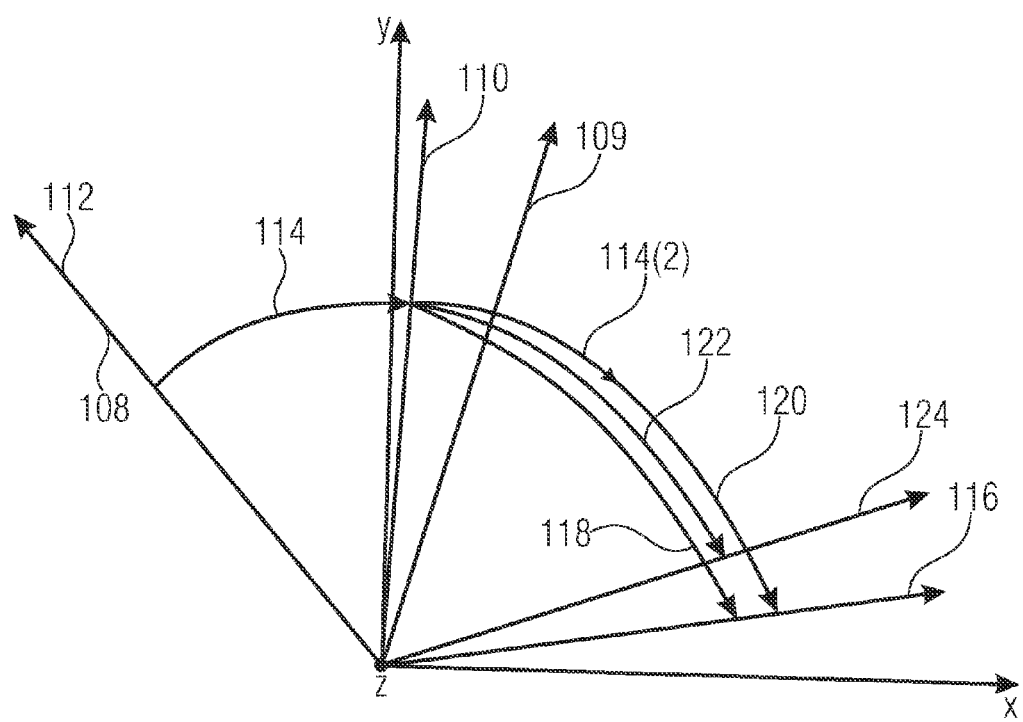
FIG. 1b shows a diagram with coded orientations representing a reorientation of an object and a current orientation of the object to be encoded.

FIG. 1b shows a portion of the illustrative reorientation of the object. The exemplary portion comprises two consecutive orientations 108 and 109, assumed to belong to a portion of the reorientation of the object already having been encoded, and ends at a current orientation 116 of the object, currently to be encoded.

When entering the encoder 100, the time series of orientations of the object might be described by a stream of spatio-temporal data. For example, each orientation may be described by a tuple of values, namely a orientation such as ($\psi$, $\theta$, $\Phi$) plus time instant t, i.e. ($\psi$, $\theta$, $\Phi$, t). Alternatively, the sequence of orientations might be defined by a sequence of orientation values ($\psi$, $\theta$, $\Phi$) only, with a constant time interval between these orientations by convention. The sequence of orientations 108, 109 and 116 might have been detected by any orientation sensor.

In FIG. 1b, the orientations 108, 109 and 116 are shown in a x-y-z-reference coordinate system with an x component, a y component and a z component perpendicular to each other (Cartesian coordinate system).

As will be described in more detail below, the encoder may be configured to encode the sequence of orientations by use of orientation change differences between one coded orientation change and the next. Further, the encoder sacrifices a little bit of accuracy in favor of data compression.

The encoded reorientation of the object as derivable from the encoded data output of the encoder 100, comprises a coded orientation 110, 112 and 124 per actual orientation 108, 109 and 116 of the object. As shown in FIG. 1b, the coded orientations 110, 112 and 124 and the actual orientations 108, 109 and 116 do not completely coincide. However, the encoded reorientation of the object described by the coded orientations closely extends along the actual reorientation of the object described by the actual orientations of the object. As will become clear from the discussion below, the loss of accuracy in encoding the reorientation of the object is more than compensated by the compression rate achieved by the encoding scheme of the encoder 100.

A last coded orientation 110 and a second last coded orientation 112 are assumed to have already been encoded. A last coded orientation change 114 describes a reorientation of the object from the second last coded orientation 112 to the last coded orientation 110. FIG. 1b furthermore shows the current orientation 116 of the object, wherein a current orientation change 118 describes a reorientation of the object from the last coded orientation 110 to the current orientation 116 of the object.

As shown in FIG. 1b, the coded orientation 112 exemplarily coincides with its associated orientation 108, while the coded orientation 110 exemplarily deviates from its associated actual orientation 109.

As shown in FIG. 1b, the encoder 100 uses orientation changes to describe the reorientation of the object, wherein the encoder 100 is configured to encode the sequence of orientations by use of orientation change differences, for example, between the last coded orientation change 114 and the current orientation change 118. In the following, several kinds of orientation changes have to be distinguished. Actual orientation changes describe a reorientation of the object from one actual orientation to the next. These orientation changes are not illustrated in FIG. 1b, as these orientation changes are not necessitated for understanding the principles of the present embodiment. Next, orientation changes currently to be coded describe a reorientation of the object from the last coded orientation, here 110, to the actual orientation currently to be coded. Here, this is the orientation change 118. Finally, coded orientation changes describe a reorientation of the object from one coded orientation to the next. As will be described below, the current orientation change 118 describing the reorientation of the object to the current orientation

116 may deviate from the coded orientation change 122 which is finally coded for describing the reorientation of the object to the coded version of the current orientation, namely the current coded orientation 124. At the decoding side, merely the latter sort of orientation changes are reconstructible, and accordingly, merely decoded orientations.

If the object's orientation is changing constantly, such as is the case if the object is rotating around an axis with constant velocity, then the current coded orientation change would be equal to the last coded orientation change 114. In that case, the orientation change difference 120 between the last coded orientation change 114 and the current coded orientation change would be zero. The current coded orientation change of that case is depicted in FIG. 1*b* with the referential numeral 114(2).

In some applications, the object changes its orientation mainly only in one plane, such as horizontally or vertically. Even more severe, however, is the fact, that mostly the sampling rate of the orientations is high enough to encode merely one selected component of the plurality of components describing the orientation change difference between the last coded orientation change and the current orientation change leading to the current coded orientation. In the following embodiment, for example, the component comprising the greatest absolute value is selected and encoded. The deviation of the currently coded orientation 124 from the actual current orientation 116 is taken into account when encoding the subsequent orientation of the object not shown in FIG. 1*b* for simplicity reasons.

In principle, the encoding of merely the greatest one of the plurality of components describing the orientation change difference 120 leads to a back and forth switching between the plurality of components during coding the reorientation of the object. One component, such as the horizontal orientation change difference angle, is selected as long as the vertical orientation change difference angle does not exceed the horizontal orientation change difference angle due to the aforementioned deviations summing-up to a to high amount. As soon as the vertical orientation change difference angle exceeds the horizontal orientation change difference angle, the deviation in vertical orientation is compensated by coding the vertical orientation change difference angle. Upon this, the decoding side is (readjusted again). In other words, according to the below outlined embodiments, it is enough to code the component of the plurality of components describing the orientation change difference 120 comprising the greatest absolute value. In some embodiments, the selector 104 may be configured to compare the absolute values of the plurality of components describing the orientation change difference 120, and to select the component comprising the greatest absolute value. The coder 106 may be configured for coding the current orientation change 118 based merely on the selected component of the orientation change difference 120 to obtain a current coded orientation change 122, thereby defining a current coded orientation 124. Thereby, a high compression rate of the original spatio-temporal data may be achieved.

In FIG. 1*b*, it has been exemplarily assumed that the deriver 102 derives three components representing the orientation change difference 120, namely the components ($\psi$, $\theta$, $\Phi$). In the present case, the encoder 100 has chosen to code the component in $\psi$ (around the z-component of the reference system), but not to code the $\theta$ and $\Phi$ components of the orientation change difference 120, thereby achieving less data to be coded. Thus, the coder 106 merely outputs a data item to describe the current coded orientation 124 (and the current orientation 116, respectively), which indicates the absence of the $\theta$ and $\Phi$ components (by use of appropriate syntax elements examples of which are described below). The current coded orientation 124 deviates therefore from the current or actual orientation 116 of the object. According to the concept of the present embodiment, an error propagation is reduced by deriving the selected component of the orientation change difference 120 in each encoding step based on the current orientation change 118 describing a reorientation of the object from the last coded orientation 110 to the current orientation 116 of the object. Hence, the error of the current coded orientation 124 may be reduced in a next encoding step while encoding the next orientation of the object. Naturally, the selector 104 may choose to select more than one component of the plurality of components (for example $\psi$, $\theta$ and $\Phi$) for all or some of the orientations in accordance with an alternative embodiment. Hereinafter, however, the embodiments describe the orientation change merely by three components ($\psi$, $\theta$, $\Phi$) with restricting the selection out of those.

Accordingly, in accordance with the below embodiments, the deriver 102 may be configured to derive a next plurality of components describing an next orientation change difference between a current coded orientation change from a last coded orientation to a current coded orientation, and a next orientation change from the current coded orientation to a next orientation of the object. Thereby, the selector may be configured to select a component of the next plurality of components describing the next orientation change difference. In addition, the coder may be configured to code the next orientation of the object based on the selected component of the next plurality of components describing the next orientation change difference, thereby defining a next coded orientation. The selected component may differ from the component selected immediately before.

In some embodiments, the deriver 102 may be configured to derive the plurality of components describing the orientation change difference 120 such that the plurality of components correspond to Euler angles of a reference system, such as the Cartesian coordinate system shown in FIG. 1*b*. The Euler angles may be used to describe the orientation of the object, for example, a rigid body. To describe the orientation in a three dimensional space three parameters ($\psi$, $\theta$, $\Phi$) are necessitated. Thereby, any orientation may be achieved by composing three elemental rotations, such as rotations around the axis of a reference coordinate system. In other words, Euler angles are a means of representing the spatial orientation of the object described by a coordinate system as a composition of rotations from a reference coordinate system.

Thus, coder 106 may generate a sequence of data items defining the coded orientations by way of defining a sequence of orientation change differences. Some data items may be constructed such that they comprise, optionally, a mode syntax element, specifying the selected component (such as out of $\psi$, $\theta$ and $\Phi$) and the selected component (thereby defining the orientation change). Other data items may be possible as well, as will be described below, such as data items including a mode syntax element indicating the absence of an orientation change difference. Moreover, a run length coding scheme may be used to further reduce data rate, if decoding delay or real time is not critical.

In some embodiments, the encoder 100 may comprise an output to provide a data item, wherein a sequence of data items may be a data stream. The data item may comprise a syntax element and a component value. The syntax element may indicate the selected component of the orientation change difference. In some embodiments, the syntax element may indicate a direction (or component) of the orientation change difference, such as right (r), left (l), up (t) or down (b), wherein the component value may be the value of the corresponding direction (or component).

Furthermore, the coder 106 may be configured to code the current orientation change difference as a syntax element signaling a repeated application of a last syntax element coding a last orientation change difference if the selected component of the orientation change difference is the same as a selected component of a last orientation change difference and if the selected component of the orientation change difference and the selected component of the last orientation change difference comprise the same value. For example, if the object is changing its orientation constantly, then the syntax element may signal a repeated application of the last syntax element. A repeated application of the last syntax element may be signaled up to ten times, wherein n may be a natural number. The syntax element may also indicate that the last syntax element may be applied n times.

In some embodiments, the encoder 100 may be configured for encoding data, wherein the data may further define a position of the object at the time series of orientations of the object. Thereby, the encoder 100 may be configured to encode a component of a plurality of components defining the position of the object.

For that purpose, the deriver 102 may be configured for deriving a plurality of components of a motion vector difference between a last coded motion vector pointing from a second last coded position to a last coded position, and a current motion vector pointing from the last coded position to a current position of the object. The selector 104 may be configured for selecting a component of the plurality of components of the motion vector difference. The coder 106 may be configured for coding the current motion vector based on the selected component of the motion vector difference to obtain a current coded motion vector, thereby defining a current coded position.

When entering the encoder 100, the time series of positions of the object might be described by a tuple of values, namely position such as (x,y,z) plus time instant t, i.e. (x,y,z,t). Alternatively, the sequence of positions might be defined by a sequence of position values (x,y,z) only, with a constant time interval between these positions by convention. The encoder 100 may be configured to use motion vectors to describe the trajectory of the object, wherein the encoder 100 may be configured to encode the sequence of positions by use of motion vector differences, for example, between the last coded motion vector and the current motion vector.

In some embodiments, a high compression rate of spatio-temporal data may be achieved by encoding merely or solely one component of the plurality of components of the motion vector difference between the last coded motion vector and the current motion vector. In a three dimensional space, the heading change of the object might be described by two components. Since the object changes its heading usually or mainly only in one direction or component, it is enough to encode the component of the plurality of components of the motion vector difference comprising the greater absolute value or directional change. Thereby, the absolute values of the plurality of components of the motion vector difference might be compared, wherein the component comprising the greater absolute value might be selected and encoded. Furthermore, an error propagation is minimized by deriving the plurality of components of the motion vector difference in each encoding step based on the current motion vector pointing to the current or actual position of the object. The deviation of a currently coded position from the actual current position is taken into account when encoding the subsequent position of the trajectory. In principle, the encoding of merely the greatest of the plurality of components describing the heading change per position leads to a back and forth switching between the plurality of components during coding the trajectory. Thereby, a high compression rate of the original spatio-temporal data may be achieved. Additionally, in some embodiments, a velocity component of the object described by the current motion vector might be coded differentially to a past coded motion vector, for example, as an increase or decrease of velocity.

Figure 2:
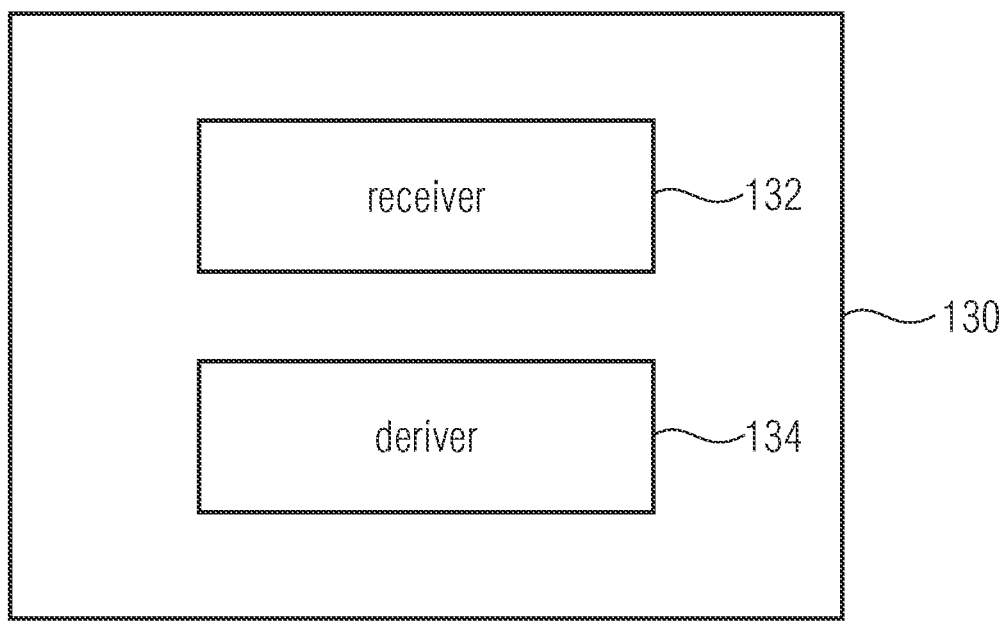
FIG. 2 shows a block diagram of a decoder for decoding data defining coded orientations representing a reorientation of an object.

FIG. 2 shows a block diagram of a decoder 130 for decoding data defining coded orientations representing a reorientation of an object based on spatio-temporal data representing a time series of orientations of the object. The decoder 130 comprises a receiver 132 and a deriver 134. The receiver 132 is configured for receiving a data item comprising a component value and/or a syntax element. The syntax element coding a selected component of a plurality of components describing an orientation change difference between a last coded orientation change from a second last coded orientation to a last coded orientation, and a current orientation change from the last coded orientation to a current orientation of the object. Thereby, the component value indicates the value of the selected component of the plurality of components describing the orientation change difference. The deriver 134 is configured for deriving a current coded orientation change 122 by applying the component value to the selected component of the last coded orientation change, the current coded orientation change 122 thereby describing a reorientation of the object from the last coded orientation 110 to the current coded orientation 124.

In the following, an exemplary embodiment of encoding data defining coded orientations representing a reorientation of an object is described. Thereby the encoded data may comprise a plurality of data items with syntax elements and component values representing the reorientation of the object.

According to the concept of the present invention, a formal language may be used for the representation of the reorientation of the object, or in other words, for encoding data defining coded orientations representing a reorientation of an object. Subsequently, the former language is referred to as reorientation behavior language (RBL). The RBL may be used to describe the behavior of an object with a (simple human readable and) machine usable language. Thereby, it may be assumed that every reorientation of the object is based on an intention where the object wants to orient to, followed, for example, by a behavior of the object. The concept or approach of the present invention may motivate a reorientation description that explains the reorientation in a semantic way, but allows a detailed reconstruction of the original reorientation of the object. Furthermore, it is possible to translate the reorientation of the object from spatio-temporal data into the representation of the reorientation of the RBL and convert back with no or little error. The translation algorithm may be latency free, i.e. a spatio-temporal data stream may be translated without needing more than the current sample at every time step. The RBL has special expression for repeated orientation changes. This results in a compact form of the representation that is easier to read and that can compress the size of the description. The approach or concept of the present invention encodes or translates the reorientation of the object into a formal language that explains the reorientation of the object in a descriptive way abstracted from the objects intention. As already mentioned, the formal language is referred to herein as reorientation behavior language (RBL) and may be constructed by a Chomsky-2 context free grammar to allow an online translation process with no latency.

Moreover, the RBL may be constructed by the Chomsky-2 context free grammar $G_{RBL}$. The context free grammar $G_{RBL}$ may consist of a vocabulary V including the alphabet $\Sigma$ and a set of production rules P. The latter may define rules for constructing words $\omega$ by substituting non-terminal symbols of the vocabulary V by terminal symbols of the alphabet $\Sigma$.

In the following, a short overview of the RBL's terminal and non-terminal symbols is given and the production rules to construct valid words w of the RBL are explained afterwards.

Before defining the RBL, some parameters that are necessitated for correct transformation into the RBL are introduced. The RBL may be time discrete, e.g. each orientation change difference symbol may correspond to a forward step in time. The sampling frequency, herein called orientation change time $\Delta T$, may have to be specified to define how long one particular orientation change takes. The orientation change time $\Delta T$ does not have to be equal to the sampling frequency of the spatio-temporal data. Data may be extra- or interpolated while the data is translated.

For implementing the translation process, a smoothing factor $\tau=]0; 1]$ might be used. If the time step in the spatio-temporal data is greater than the orientation change time $\Delta T$ or if some samples are lost, the RBL may smooth the orientation change to fit the actual behavior of the object.

The RBL grammar may consist of variables according to Equation (1). These non-terminals are placeholders for symbols that are replaced via the production rules P by the terminal symbols (equation (2)) representing specific commands of the RBL.

$$V=\{S, C, O, I, Q\} \quad (1)$$

$$\Sigma=\{f, r, l, t, b, p, o, *, +, ., -, \#, \backslash, /\} \quad (2)$$

The non-terminals may be grouped into production symbols, orientation change difference symbols and informational symbols as stated in the following first table:

| Non-terminal | Description |
| --- | --- |
| | Production |
| S | start non-terminal |
| C | specific symbol |
| | Orientation |
| O | orientation change difference symbol |
| | State |
| I | state information |
| Q | quantifier symbol |

Production symbols may be used to construct a reorientation of the object, wherein S may be the start symbol. Orientation change difference symbols may describe changes in the appearance of the reorientation of the object. The state symbols may change the internal state of the object, e.g. the actual absolute orientation of the object, or inform about repetitions with the quantifier symbol.

The final symbols of a word $\omega$ constructed by the grammar $G_{RBL}$ are the terminal symbols $\Sigma$ as stated in the following second table:

| Terminal | Command | Description |
| --- | --- | --- |
| | Orientation change | |
| 'f' | forward | orientation change difference = 0 |
| 'r' | right | orientation change difference right |
| 'l' | left | orientation change difference left |
| 't' | up | orientation change difference up |
| 'b' | down | orientation change difference down |
| | Quantification | |
| '*' | very often | repetition very often |
| '+' | often | repetition often |
| '.' | normal | repetition normal |
| '-' | rare | repetition rare |
| '#' | very rare | repetition very rare |
| | Information | |
| 'p' | position | set actual position |
| 'o' | orientation | set actual orientation |
| | Structural | |
| '(',')' | symbol block | block of symbols |
| '{','}' | quantifier expression | indicate numeric quantifier |
| '""' | comment block | |

The terminals are grouped into orientation change difference symbols, quantification symbols, velocity symbols and structural symbols. Orientation change difference symbols may describe a concrete orientation change, including a step in time. Orientation change difference symbols may be, for example:

f "no orientation change difference"
r<d> "right orientation change difference by <d> degrees"
l<d> "left orientation change difference by <d> degrees"
t<d> "up (top) orientation change difference by <d> degrees"
b<d> "down (bottom) orientation change difference by <d> degrees"

Alternatively, instead of a rotation in degrees, a inverse curve radius (curvature) might be stated (1/r).

Quantification symbols may describe a relative repetition of blocks. Quantification symbols may be, for example:

(<S>){<r>} "<r> times repetition of symbols <S>"

Information symbols may be, for example:

p<x>,<y>,<z> "set position to <x>, <y>, <z>"
o<Ψ>,<Θ>,<Φ> "set orientation <Ψ>,<Θ>,<Φ>"

In some embodiments, a symbol in the RBL may correspond to a data item of the encoder 100 or the decoder 130, wherein the data item may comprise a syntax element, such as forward (f), right (r) or start (S), and/or a component value, such as <d> or <Ψ>.

Productions may describe the syntax of the language. A non-terminal symbol on the left hand side might be replaced by symbols on the right hand side, which can be non-terminal symbols or terminal symbols (Chomsky-2). The productions can be grouped for different purposes, which are explained in the following.

Subsequently, general rules, orientation change rules, informal rules and quantifier rules are introduced and described.

General rules may describe the start and further constructions of the RBL, respectively the reorientation of the object.

S→SC|C  (3)

Thereby, an average reorientation of the object may start with the symbol S which is replaced by one or more symbols C according to equation (3).

$$C \rightarrow O \quad (4)$$

$$C \rightarrow I \quad (5)$$

The non-terminal symbol C can be transformed into a symbol for orientation change difference O according to equation (4), or state information I according to equation (5).

Orientation change rules can describe productions to physical orientation change difference symbols of the object:

$$O \rightarrow f|r|l..t|b \quad (6)$$

In some embodiments, there are three ways to specify orientation change differences. First, orientation change differences can be expressed by a simple orientation change difference symbol according to equation (6), wherein a default value for the orientation change difference might be assumed. Secondly, a orientation change difference can be attributed. The attribute may be a special argument in the RBL grammar for parameterizing the degree of orientation change difference. The attribute <d> may specify the orientation change difference in form of a degree, i.e. the horizontal or vertical orientation change difference in one time step. The orientation change difference symbol with or without an attribute might be followed by a colon and the quantifier non-terminal Q. If a quantifier is given, the orientation change difference may be the fragment given by the quantifier Q of the orientation change difference attribute. For example, $$O = r180:2 = r90$$

describes a half segment of a 180° right orientation change difference.

All orientation change difference terminals are quantizers, that means, for each symbol the object performs a time step and a orientation change specified by the orientation change difference.

Informal rules may be non-behavior rules. They may be necessitated for reconstructing the original reorientation of the object from the behavior description.

$$I \rightarrow 0 <\Psi>, <\Theta>, <\Phi> \quad (7)$$

Rule or equation (7) defines the actual orientation of the object at the moment. It can be used at the beginning of the representation of the reorientation of the object and can be updated whenever the orientation reconstructed from the reorientation description differs from the real orientation, for example, when synchronization is needed. These might be nenecessitated, for example, in case symbols are lost while transmitting them over a network.

Quantifier rules may be used to advance the human readability and are important for comparison. They can also compress the description for the same reorientation of the object enormously.

$$C \rightarrow (S)Q \quad (8)$$

$$Q \rightarrow \{<r>\} \quad (9)$$

$$Q \rightarrow *|+|.|-|\# \quad (10)$$

Rule or equation (8) describes the syntax of a quantifier. The quantifier operates on the immediately preceding symbol S enclosed by braces. Rule or equation (9) specifies that S is repeated <r> times. Rule or equation (10) does the same for repetitions of the symbol S according to the second Table. The former rule is used for precise reorientations of the object, the latter for comparison of precise reorientations of the object with generic patterns.

Comments can be enclosed by ". They allow comments within the RBL or can be used to disable orientation change difference parts of a word ω in the RBL.

$$C \rightarrow \text{"<string>"}$$

If the object is changing its orientation in a three dimensional space and a vertical and a horizontal orientation change difference is performed in one time step, then the orientation change difference with the larger change (or absolute value) is stated first, e.g. if a horizontal orientation change difference is larger than a vertical orientation change difference, only the horizontal orientation change difference is done at the first step. The neglected horizontal or vertical shift is added to the next time step where again the larger orientation change difference is evaluated. Additionally, the comparison can be weighted to achieve a better resolution in one plane.

Subsequently, a translation of spatio-temporal data into the RBL is described, or in other words, an encoding of spatio-temporal data according to the concept of the present invention is described.

Definition: Let $T_A$ be the reorientation of an object A. The reorientation $T_A = (L_{t0}, L_{t1}, \ldots; L_T)$ is the time series of the object's orientations $L_t$. $L_t = (\Psi_t, \Theta_t, \Phi_t)$ is the orientation in a three dimensional space at the time t. T is the time at the final orientation of the object.

In some embodiments, the transformation method generates the reorientation description of the object in the RBL from a spatio-temporal data stream. The RBL may be defined in a strict time discrete way, wherein ΔT is the constant orientation change time or sampling time.

Definition: Let $\omega_A$ be a word of the grammar $G_{RBL}$ that describes the reorientation of object A. The word $\omega_A$ is the series of symbols $c_i$ that expresses the object's reorientation, wherein $\omega_A = (c_0, c_1, \ldots, c_n)$, i.e. the word $\omega_A$ has the length n. The transformation $F_{RBL}: T_A \rightarrow \omega_A$ transforms the reorientation $T_A$ of the object into the word $\omega_A$.

The transformation method of the present invention is able to transform a given reorientation into the corresponding description in the RBL. Since each time step comprises only one symbol for the orientation change difference (for example, horizontal or vertical orientation change difference), the RBL transformation may insert an error in, for example, a three dimensional space.

Some embodiments of the present invention propose a representation for the reorientation of an object based on a formal language (RBL). The RBL is constructed by the purpose of being translated online and allows a detailed reconstruction of the objects reorientation with a zero sampling latency translation in both directions. The defined grammar $G_{RBL}$ allows a translation from real data sets.

Some embodiments of the present invention provide a reorientation representation for three dimensional data. According to the concept of the present invention, a intension based description of the reorientation of the object, describing the behavior of the object, is used. The representation can be established on a Chomsky-2 formal language and can be produced online.

Furthermore, some embodiments of the present invention provide a more human related approach for the description language. The description might be advantageous for artificial methods like recognizing orientation change patterns or finding an unusual behavior of the object. The reorientation representation according to the concept of the present invention addresses a set of requirements that spatio-temporal data is unsuitable for. The representation describes the reorientation of the object, including the. In addition, the representation is intuitively readable and writable by humans, but also interpretable and analyzable by machines. The description allows a detailed reconstruction of the reorientation of the object and may be translated on runtime (online), e.g. when the complete reorientation cannot be observed at any sampling point. Moreover, the translation process comprises a minimum latency, or in other words, (almost) no delay is introduced by converting into the representation.

Embodiments of the present invention provide a method for encoding data defining coded orientations representing a reorientation of an object based on spatio-temporal data representing a time series of orientations of the object. In a first step, a plurality of components describing an orientation change difference between a last coded orientation change from a second last coded orientation to a last coded orientation, and a current orientation change from the last coded orientation to a current orientation of the object is derived. In a second step, a component of the plurality of components describing the orientation change difference is selected. In a third step, the current orientation of the object is coded based on the selected component of the plurality of components describing the orientation change difference, thereby defining a current coded orientation.

Unlike data stream-based methods, such as incremental coding, delta encoding, front compression, back compression, front coding and discrete cosine transformation (DCT), the concept or approach of the present invention is intention based. Thereby, an abstraction may be made from the data streams and the behavior may be transformed into symbols. In conventional data based methods the entropy of the data is the theoretical limit, in the present invention, the behavior may be abstracted, i.e. the compression rate depends on the entropy of the behavior. Furthermore, a pattern comparison may be possible in the compressed representation. In some embodiments, time data streams are considered as one unit, wherein no separation of dimension takes place.

In contrast to known resampling based concepts, some embodiments leave out sampling points having only little influence on the reorientation of the object, however, all sampling points may be considered. Compared to known semantic approaches, the concept of the present invention allows restoring the reorientation of the object in detail.

In some embodiments, three dimensional data is transformed into a specific representation form in the "object view". Thereby, typical characteristics of the object's reorientation may be used. For example, changes in orientation usually only have an effect on one dimension (such as right/left or up/down), the larger change may only be carried out with simultaneous change of right/left, up/down. In addition, certain processes may be repeated several times. Thereby, in a first stage, a compression may be obtained by performing a dimensional reduction. In a second stage, repetitions may be detected.

Another embodiment is a method for encoding data. In a first step, the orientation data is transformed into the RBL. In a second step, repetitions in the RBL are searched. Optionally, in a third step, the RBL symbols are encoded, for example, with a binary encoding, a Huffman encoding or an adapted Huffman encoding.

Embodiments of the present invention provide a method for decoding data defining coded orientations representing a reorientation of an object based on spatio-temporal data representing a time series of orientations of the object. In a first step, a data item comprising a component value and a syntax element is received. The syntax element codes a selected component of a plurality of components describing an orientation change difference between a last coded orientation change from a second last coded orientation to a last coded orientation, and a current orientation change from the last coded orientation to a current orientation of the object. The component value indicates the value of the selected component of the plurality of components describing the orientation change difference. In a second step, the current coded orientation change is derived by applying the component value to the selected component of the last coded orientation change, the current coded orientation change thereby describing a reorientation of the object from the last coded orientation to the current coded orientation.

A further embodiment is a method for decoding data. Optionally, in a first step, the symbols in the RBL might be decoded. In a second step, the RBL may be retransformed into location data.

In some embodiments, the RBL might comprise further properties. For example, the last x/typical expression might be stored in parentheses as a codebook. "Sampling points" (p/o) might be transmitted for minimizing or reducing fragments in disturbed transmissions. Furthermore, a specific construct for showing combined right/left—up/down orientation change differences might be introduced for increasing quality (with that, an almost lossless compression would be possible—depending on the transmitted floating-point number accuracy). In addition, some embodiments of the present invention may use dynamic resampling, for example, for translating into the RBL.

In contrast to known concepts, the RBL allows encoding and decoding reorientations of an object at runtime (online). Furthermore, the RBL is latency-free for compression without repetitions, since no random access is necessitated as reorientations don't have to be stored. Thereby, the compression factor/quality may be adjustable. For example, based on a lossy compression a lossless compression might be achieved by means of an alphabet extension. In addition, reorientations can be compared in a compressed manner.

In an exemplary application, the RBL might be used for a transmission of orientation data streams to mobile devices. Moreover, the RBL might be used for storing large amounts of orientation data, due to its high compression rate.

Some embodiments of the present invention relate to a data stream with data items defining coded orientations representing a reorientation of an object based on spatio-temporal data representing a time series of orientations of the object. The data item comprises a component value and a syntax element. The syntax element codes a selected component of a plurality of components of an orientation change difference between a last coded orientation change from a second last coded orientation to a last coded orientation, and a current orientation change from the last coded orientation to a current orientation of the object. Thereby, the component value indicates the value of the selected component of the plurality of components describing the orientation change difference. Moreover, the data stream might be a sequence of data items, wherein at least one data item may comprise a syntax element and/or a component value.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises a system configured to electronically or optically transfer a computer program for performing one of the methods described herein to a receiver. The receiver may, for example, be a computer, a memory device or the like. The system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An encoder for encoding data defining coded orientations representing a reorientation of an object based on spatio-temporal data representing a time series of orientations of the object, the encoder comprising:
   a deriver configured to derive a plurality of components describing an orientation change difference between a last coded orientation change from a second last coded orientation to a last coded orientation, and a current orientation change from the last coded orientation to a current orientation of the object;
   a selector configured to select a component of the plurality of components describing the orientation change difference; and
   a coder configured to code the current orientation of the object by coding the selected component of the plurality of components describing the orientation change difference, thereby defining a current coded orientation, wherein the coder is configured to not code another component or components of the plurality of components describing the orientation change difference; wherein
   the time series of orientations of the object is detected by an orientation sensor;
   the deriver is configured to derive the plurality of components describing the orientation change difference such that the plurality of components correspond to angular components of an angular coordinate system;
   the deriver is configured to derive the plurality of components describing the orientation change difference such that the plurality of components correspond to Euler angles of a reference system; and
   each of the deriver, the selector, and the coder is implemented using an integrated circuit, a field programmable gate array, or a digital signal processor, or a combination of at least two of the integrated circuit, the field programmable gate array, and the digital signal processor.

2. The encoder according to claim 1, wherein the deriver is configured to derive a next plurality of components describing a next orientation change difference between a current coded orientation change from a last coded orientation to a current coded orientation, and a next orientation change from the current coded orientation to a next orientation of the object;
   wherein the selector is configured to select a component of the next plurality of components describing the next orientation change difference; and
   wherein the coder is configured to code the next orientation of the object based on the selected component of the next plurality of components describing the next orientation change difference, thereby defining a next coded orientation.

3. The encoder according to claim 1, wherein the data further defines a position of the object at the time series of orientations of the object, wherein the encoder is further configured to encode a component of a plurality of components defining the position of the object.

4. The encoder according to claim 1, wherein the selector is configured to compare the absolute values of the plurality of components describing the orientation change difference and to select the component comprising the greatest absolute value.

5. The encoder according to claim 1, wherein the coder is configured to provide a data item, wherein the data item comprises a coded component indicating the selected component of the plurality of components describing the orientation change difference.

6. The encoder according to claim 5, wherein the data item further comprises a component value of the selected component of the plurality of components describing the orientation change difference.

7. The encoder according to claim 1, wherein the encoder is configured to translate the data into a word of a formal language.

8. The encoder according to claim 7, wherein the formal language comprises an alphabet and a set of production rules for defining coded orientation change differences, the formal language allowing an indication of a repeated application of portions of the word.

9. The encoder according to claim 1, wherein the deriver is configured to derive the plurality of components describing the orientation change difference such that the plurality of components are yaw and pitch angles.

10. The encoder according to claim 1, wherein the deriver is configured to code the selected component of the plurality of components describing the orientation change difference and to not code another component or components of the plurality of components describing the orientation change difference, even if the plurality of components are unequal to zero.

11. A decoder for decoding data defining coded orientations representing a reorientation of an object based on spatio-temporal data representing a time series of orientations of the object, the decoder comprising:
  a receiver configured to receive a data item comprising a component value and coded components, the coded components coding a selected component of a plurality of components describing an orientation change difference between a last coded orientation change from a second last coded orientation to a last coded orientation, and a current orientation change from the last coded orientation to a current orientation of the object, wherein the component value indicates the value of the selected component of the plurality of components describing the orientation change difference, and wherein the coded components do not code another component or components of the plurality of components describing the orientation change difference; and
  a deriver configured to derive the current coded orientation change by applying the component value to the selected component of the last coded orientation change, the current coded orientation change thereby describing a reorientation of the object from the last coded orientation to the current coded orientation; wherein
  the time series of orientations of the object is detected by an orientation sensor;
  the plurality of components describing the orientation change difference correspond to angular components of an angular coordinate system;
  the deriver is configured to derive the plurality of components describing the orientation change difference such that the plurality of components correspond to Euler angles of a reference system; and
  each of the receiver and the deriver is implemented using an integrated circuit, a field programmable gate array, or a digital signal processor or a combination of at least two of the integrated circuit, the field programmable gate array, and the digital signal processor.

12. A method for encoding data defining coded orientations representing a reorientation of an object based on spatio-temporal data representing a time series of orientations of the object, wherein the time series of orientations of the object is detected by an orientation sensor, the method comprising:
  deriving a plurality of components describing an orientation change difference between a last coded orientation change from a second last coded orientation to a last coded orientation, and a current orientation change from the last coded orientation to a current orientation of the object;
  selecting a component of the plurality of components describing the orientation change difference; and
  coding the current orientation of the object by coding the selected component of the plurality of components describing the orientation change difference, thereby defining a current coded orientation, wherein another component or components of the plurality of components describing the orientation change difference are not coded; wherein
  the plurality of components describing the orientation change difference are derived such that the plurality of components correspond to angular components of an angular coordinate system;
  the plurality of components describing the orientation change difference are derived such that the plurality of components correspond to Euler angles of a reference system; and
  the method is performed using an integrated circuit, a field programmable gate array, or a digital signal processor a combination of at least two of the integrated circuit, the field programmable gate array, and the digital signal processor.

13. A method for decoding data defining coded orientations representing a reorientation of an object based on spatio-temporal data representing a time series of orientations of the object, wherein the time series of orientations of the object is detected by an orientation sensor, the method comprising:
  receiving a data item comprising a component value and coded components, the coded components coding a selected component of a plurality of components describing an orientation change difference between a last coded orientation change from a second last coded orientation to a last coded orientation, and a current orientation change from the last coded orientation to a current orientation of the object, wherein the component value indicates the value of the selected component of the plurality of components describing the orientation change difference, and wherein the coded components do not code another component or components of the plurality of components describing the orientation change difference; and
  deriving the current coded orientation change by applying the component value to the selected component of the last coded orientation change, the current coded orientation change thereby describing a reorientation of the object from the last coded orientation to the current coded orientation; wherein the plurality of components describing the orientation change correspond to angular components of an angular coordinate system;

the plurality of components describing the orientation change difference are derived such that the plurality of components correspond to Euler angles of a reference system; and the method is performed using an integrated circuit, a field programmable gate array, or a digital signal processor or a combination of at least two of the integrated circuit, the field programmable gate array, and the digital signal processor.

14. A non-transitory computer readable medium comprising a computer program comprising a program code for performing, when running on a computer or microprocessor, a method for encoding data defining coded orientations representing a reorientation of an object based on spatio-temporal data representing a time series of orientations of the object, wherein the time series of orientations of the object is detected by an orientation sensor, the method comprising:

deriving a plurality of components describing an orientation change difference between a last coded orientation change from a second last coded orientation to a last coded orientation, and a current orientation change from the last coded orientation to a current orientation of the object;

selecting a component of the plurality of components describing the orientation change difference; and coding the current orientation of the object by coding the selected component of the plurality of components describing the orientation change difference, thereby defining a current coded orientation, wherein another component or components of the plurality of components describing the orientation change difference are not coded; wherein the plurality of components describing the orientation change difference are derived such that the plurality of components correspond to angular components of an angular coordinate system; and the plurality of components describing the orientation change difference are derived such that the plurality of components correspond to Euler angles of a reference system.

15. A non-transitory computer readable medium comprising a computer program comprising a program code for performing, when running on a computer or microprocessor, a method for decoding data defining coded orientations representing a reorientation of an object based on spatio-temporal data representing a time series of orientations of the object, wherein the time series of orientations of the object is detected by an orientation sensor, the method comprising:

receiving a data item comprising a component value and coded components, the coded components coding a selected component of a plurality of components describing an orientation change difference between a last coded orientation change from a second last coded orientation to a last coded orientation, and a current orientation change from the last coded orientation to a current orientation of the object, wherein the component value indicates the value of the selected component of the plurality of components describing the orientation change difference, and wherein the coded components do not code another component or components of the plurality of components describing the orientation change difference; and deriving the current coded orientation change by applying the component value to the selected component of the last coded orientation change, the current coded orientation change thereby describing a reorientation of the object from the last coded orientation to the current coded orientation; wherein the plurality of components describing the orientation change correspond to angular components of an angular coordinate system; and the plurality of components describing the orientation change difference are derived such that the plurality of components correspond to Euler angles of a reference system.

* * * * *